US012584033B2

(12) United States Patent
Nakata et al.

(10) Patent No.: US 12,584,033 B2
(45) Date of Patent: Mar. 24, 2026

(54) INK JET RECORDING METHOD AND INK JET RECORDING APPARATUS

(71) Applicant: CANON KABUSHIKI KAISHA, Tokyo (JP)

(72) Inventors: Eiichi Nakata, Kanagawa (JP); Yuko Negishi, Tokyo (JP); Ryo Tsujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 18/645,122

(22) Filed: Apr. 24, 2024

(65) Prior Publication Data

US 2024/0360332 A1 Oct. 31, 2024

(30) Foreign Application Priority Data

Apr. 28, 2023 (JP) ................................. 2023-074068
Mar. 27, 2024 (JP) ................................. 2024-051818

(51) Int. Cl.
| | |
|---|---|
| *B41J 2/21* | (2006.01) |
| *B41J 2/01* | (2006.01) |
| *B41J 11/00* | (2006.01) |
| *B41M 3/00* | (2006.01) |
| *B41M 5/00* | (2006.01) |
| *B41M 7/00* | (2006.01) |

(Continued)

(52) U.S. Cl.
CPC ........... *C09D 11/54* (2013.01); *B41J 11/0022* (2021.01); *B41M 3/001* (2013.01); *B41M 3/008* (2013.01); *B41M 5/0047* (2013.01); *B41M 5/0064* (2013.01); *B41M 7/009*

(2013.01); *C09D 11/037* (2013.01); *C09D 11/107* (2013.01); *C09D 11/12* (2013.01); *C09D 11/322* (2013.01); *C09D 11/326* (2013.01)

(58) Field of Classification Search
CPC ........ B41J 2/01; B41J 2/2114; B41J 11/0022; B41M 5/0017; B41M 7/009; C09D 11/54; C09D 11/322
See application file for complete search history.

(56) References Cited

U.S. PATENT DOCUMENTS

| | | | |
|---|---|---|---|
| 2014/0232782 A1* | 8/2014 | Mukai | B41J 2/2107 |
| | | | 524/88 |
| 2016/0319141 A1* | 11/2016 | Sugita | C09D 11/12 |

(Continued)

FOREIGN PATENT DOCUMENTS

| | | |
|---|---|---|
| EP | 3375828 A1 | 9/2018 |
| JP | 2021142725 A | 9/2021 |

*Primary Examiner* — Jason S Uhlenhake

(74) *Attorney, Agent, or Firm* — Canon U.S.A., Inc. IP Division

(57) ABSTRACT

An ink jet recording method includes a step of providing a recording medium with an aqueous ink containing a pigment dispersed by an action of an anionic group, a resin particle and a wax particle and an aqueous reaction liquid containing a reaction agent that reacts with the aqueous ink and a step of heating the recording medium provided with the aqueous ink and the aqueous reaction liquid. A heating temperature, a glass transition temperature of the resin particle and a melting point of the wax particle satisfy a predetermined relationship, average particle diameters of the pigment and the wax particle satisfy a predetermined relationship and anionic groups of the pigment, the resin particle and the wax particle satisfy a predetermined relationship.

10 Claims, 2 Drawing Sheets

(51) Int. Cl.
    _C09D 11/037_      (2014.01)
    _C09D 11/107_      (2014.01)
    _C09D 11/12_        (2006.01)
    _C09D 11/322_      (2014.01)
    _C09D 11/326_      (2014.01)
    _C09D 11/54_        (2014.01)

(56)            References Cited

U.S. PATENT DOCUMENTS

2018/0273789  A1*   9/2018  Matsuzaki ............ C09D 11/54
2021/0162778  A1*   6/2021  Asakawa ........... B41J 11/00216

* cited by examiner

INK JET RECORDING METHOD AND INK JET RECORDING APPARATUS

BACKGROUND

Field

The present disclosure relates to an ink jet recording method and an ink jet recording apparatus.

Description of the Related Art

In recent years, an ink jet recording method has been more frequently used in a sign and display field such as recording of posters and huge advertisements. In such a field, from the viewpoint of durability and the cost of a medium, a polyvinyl chloride sheet, a polyethylene terephthalate (PET) sheet and the like are frequently used. These are recording media in which a recording surface of the recording medium has no or almost no aqueous-ink-absorption layer and are so-called nonabsorbent recording media (recording media having no aqueous-ink absorbency) or low-absorbent recording media (recording media having low aqueous-ink absorbency). Hereafter a recording medium with a surface having almost no ink absorbency is also referred to as "nonabsorbent recording medium". To date, when an image is printed on not only an absorbent recording medium but also a nonabsorbent recording medium, a solvent-based ink, a curable ink, or the like has been used. However, from the viewpoint of reducing an environmental load, an odor and the like, there is a growing need for an aqueous ink by using an aqueous medium.

An image printed on not only an absorbent recording medium but also a nonabsorbent recording medium used in the sign and display field is required to have excellent abrasion resistance and color developability. To address such a requirement, according to the description of, for example, Japanese Unexamined Patent Application Publication No. 2021-142725, in a proposed method, an image exhibiting high abrasion resistance, while high productivity is ensured, is printed by a reaction liquid that aggregates a component of an aqueous ink being brought into contact, on a recording medium, with an aqueous ink containing an acrylic resin particle and wax.

The present inventors investigated the recording method proposed in Japanese Unexamined Patent Application Publication No. 2021-142725. As a result, it was found that high productivity is ensured by using the reaction liquid, although the abrasion resistance of the printed image is not limited to being sufficient and there is room for further improvement.

SUMMARY OF THE INVENTION

Accordingly, the present disclosure provides an ink jet recording method capable of recording an image having excellent abrasion resistance and color developability by using an aqueous ink and an aqueous reaction liquid. In addition, the present disclosure provides an ink jet recording apparatus used for the ink jet recording method.

That is, the present disclosure provides an ink jet recording method for recording an image on a recording medium by using an aqueous ink and an aqueous reaction liquid containing a reaction agent that reacts with the aqueous ink, the method including providing the recording medium with the aqueous reaction liquid, providing the aqueous ink so that the aqueous ink overlaps at least a portion of a region of the recording medium to be provided with the aqueous reaction liquid and heating the recording medium provided with the aqueous ink and the aqueous reaction liquid to a predetermined heating temperature $T_F(^\circ$ C.), wherein the aqueous ink contains a pigment dispersed by an action of an anionic group, a resin particle and a wax particle, the heating temperature $T_F$ ($^\circ$ C.), a glass transition temperature $T_G$ ($^\circ$ C.) of the resin particle and a melting point $T_M$ ($^\circ$ C.) of the wax particle satisfy a relationship denoted by Formula (1), an average particle diameter $D_{Pig}$ (nm) of the pigment and an average particle diameter $D_{Wax}$ (nm) of the wax particle satisfy a relationship denoted by Formula (2) and an anionic group $E_{Pig}$ ($\mu$mol/g) of the pigment, an anionic group $E_{Em}$ ($\mu$mol/g) of the resin particle and an anionic group $E_{Wax}$ ($\mu$mol/g) of the wax particle satisfy a relationship denoted by Formula (3):

$$T_M > T_F \geq (T_G - 10) \tag{1}$$

$$4.00 \geq (D_{Wax}/D_{Pig}) \geq 0.70 \tag{2}$$

$$E_{Wax} \leq E_{Em} < E_{Pig}. \tag{3}$$

Further features of the present disclosure will become apparent from the following description of exemplary embodiments with reference to the attached drawings.

DESCRIPTION OF THE EMBODIMENTS

Figure 1:
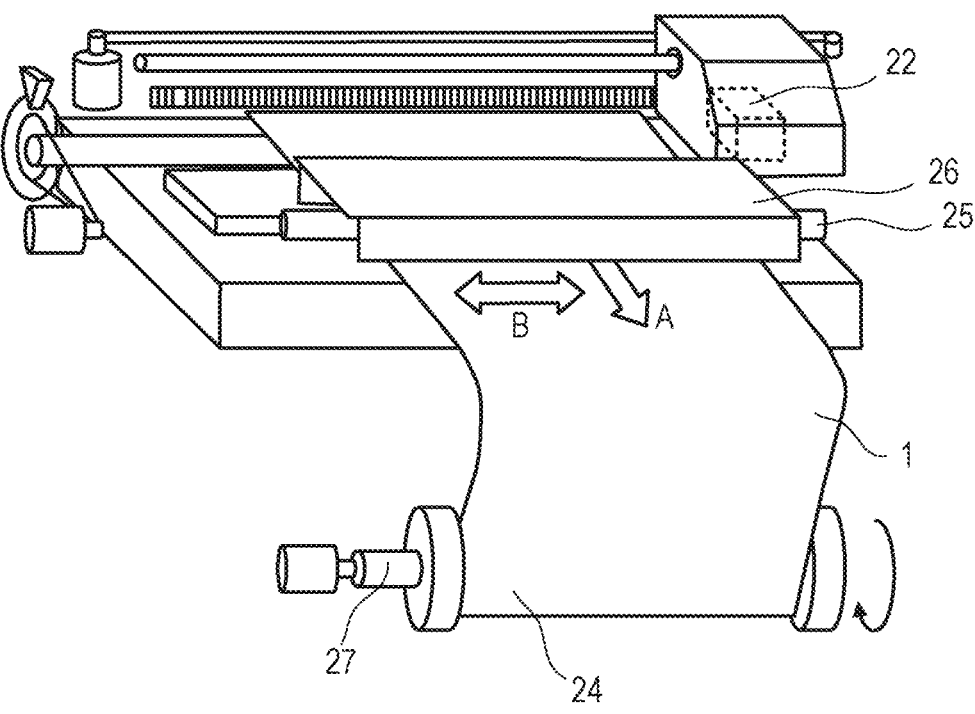
FIG. 1 is a schematic perspective view illustrating an embodiment of an ink jet recording apparatus according to the present disclosure.

The present disclosure will be further described below in detail with reference to an exemplary embodiment. In the present disclosure, when a compound is a salt, the salt is dissociated in an ink and a reaction liquid and is present as an ion. This state is expressed as "a salt is contained" for the sake of convenience. In addition, an aqueous ink and an aqueous reaction liquid for ink jet may be simply referred to as "ink" and "reaction liquid". A physical property value is a value at room temperature (25° C.) unless otherwise specified. Expressions, "(meth)acrylic acid" and "(meth) acrylate" denote "acrylic acid, methacrylic acid" and "acrylate, methacrylate", respectively.

The present inventors used an ink and a reaction liquid (treatment liquid) proposed in Japanese Unexamined Patent Application Publication No. 2021-142725, printed an image by heating a recording medium provided with these to a predetermined heating temperature ($T_F$ ($^\circ$ C.)), and examined the abrasion resistance of the image. Specifically, an aqueous ink and a treatment liquid A described in Example 8 in Japanese Unexamined Patent Application Publication No. 2021-142725 were used, and an image was printed where the heating temperature ($T_F$ ($^\circ$ C.)) was set to be 90° C. In this regard, the aqueous ink contained the wax particle (particle formed of wax) having a melting point ($T_M$ ($^\circ$ C.)) of 90° C. and the urethane-based resin particle having a glass transition temperature ($T_G$ ($^\circ$ C.)) of 90° C. As a result, since it was found that the abrasion resistance of the printed image was not always sufficient, the present inventors investigated the cause thereof.

According to SEM observation of the surface of the image, it was found that a portion of the wax particle was melted by heating and that exposure of the wax particle at the surface of the image was decreased. It is estimated that the friction coefficient of the image surface was not sufficiently decreased due to exposure of the wax particle being decreased and the abrasion resistance of the image was not improved. Then, when an image was printed where the heating temperature ($T_F$ (° C.)) was sufficiently lowered than the melting point ($T_M$ (° C.)) of the wax particle, a state in which the wax particle was not melted on the image surface and was sufficiently exposed at the image surface was observed. However, it was observed that a portion of the urethane-based resin particle was present while maintaining the particle state without being fused, and it was found that the abrasion resistance of the image was not improved.

Then, an image was printed by setting the heating temperature ($T_F$ (° C.)) to be a temperature at which the urethane-based resin particle was sufficiently fused and by using the wax particle having a melting point ($T_M$ (° C.)) higher than the heating temperature ($T_F$(° C.)). As a result, a state in which fusion of the urethane-based resin particle sufficiently advanced on the image surface and, in addition, the wax particle was exposed at the image surface was observed, and it was found that the abrasion resistance of the image was improved.

To further improve the abrasion resistance of the image, the present inventors noted the particle diameter of each of the wax particle and the pigment. Specifically, further investigation was performed under the assumption that the wax particle is more readily exposed at the image surface by using the wax particle having a large particle diameter compared with the pigment. As a result, it was found that the abrasion resistance of the image was further improved by using the wax particle having a large particle diameter compared with the pigment.

That is, the ink jet recording method according to the present disclosure has the following features. The aqueous ink contains a pigment dispersed by an action of an anionic group, a resin particle and a wax particle. The heating temperature $T_F$ (° C.) of the recording medium provided with the aqueous ink and the aqueous reaction liquid, the glass transition temperature $T_G$ (° C.) of the resin particle and the melting point $T_M$ (° C.) of the wax particle satisfy a relationship denoted by Formula (1). The average particle diameter $D_{Pig}$ (nm) of the pigment and the average particle diameter $D_{Wax}$ (nm) of the wax particle satisfy a relationship denoted by Formula (2). The anionic group $E_{Pig}$ (µmol/g) of the pigment, the anionic group $E_{Em}$ (µmol/g) of the resin particle and the anionic group $E_{Wax}$ (µmol/g) of the wax particle satisfy a relationship denoted by Formula (3). The present inventors estimate that the mechanism in which an image having excellent abrasion resistance and color developability is printed by the above-described configuration is as described below.

$$T_M > T_F \geq (T_G - 10) \tag{1}$$

$$4.00 \geq \left(D_{Wax}/D_{Pig}\right) \geq 0.70 \tag{2}$$

$$E_{Wax} \leq E_{Em} < E_{Pig} \tag{3}$$

The ink contains the pigment dispersed by an action of a carboxylic acid group. Therefore, when the ink comes into contact with the aqueous reaction liquid containing the reaction agent that reacts with the aqueous ink, the pigment reacts with the reaction agent in the reaction liquid, and aggregation occurs due to electrostatic interaction.

The ink contains the resin particle and the wax particle in addition to the pigment. The resin particle is fused with the image surface due to heating or the like and forms a resin film so that the abrasion resistance of the image is improved. In this regard, the wax particle remaining on the image surface enables the image to be provided with slippiness and leads to improving the abrasion resistance of the image.

The heating temperature $T_F$ (° C.) of the recording medium provided with the aqueous ink and the aqueous reaction liquid, the glass transition temperature $T_G$ (° C.) of the resin particle and the melting point $T_M$ (° C.) of the wax particle satisfy the relationship denoted by Formula (1). That is, the heating temperature of the recording medium is set to be 10° C. or more higher than the glass transition temperature of the resin particle to lower than the melting point of the wax particle. As a result, the resin particle is sufficiently fused with the image surface and forms a resin film. The wax particle is in a state of being exposed at the image surface without being melted on the image surface so that the abrasion resistance of the image is improved.

$$T_M > T_F \geq (T_G - 10) \tag{1}$$

When the heating temperature of the recording medium is higher than or equal to the melting point of the wax particle, the molten wax flows down, a sufficient amount of wax is unable to remain on the surface of the image, and it is difficult to decrease the friction coefficient of the image surface. As a result, the abrasion resistance of the image is not obtained. In this regard, when $T_F < (T_G - 10)$, the resin particle is not sufficiently fused with the image surface, and a resin film is not formed. As a result, abrasion resistance of the image is not obtained.

The average particle diameter $D_{Pig}$ (nm) of the pigment and the average particle diameter $D_{Wax}$ (nm) of the wax particle satisfy the relationship denoted by Formula (2). The $D_{Pig}$ (nm) and the $D_{Wax}$ (nm) satisfying Formula (2) enables the image having the characteristics of excellent abrasion resistance and excellent color developability in combination to be printed.

$$4.00 \geq \left(D_{Wax}/D_{Pig}\right) \geq 0.70 \tag{2}$$

When the value of "$D_{Wax}/D_{Pig}$" is more than 4.00, surface scattering due to the wax particle localized on the image surface is increased, and the color developability of the image is not obtained. On the other hand, when the value of "$D_{Wax}/D_{Pig}$" is less than 0.70, the pigment is readily exposed at the image surface compared with the wax particle, and the abrasion resistance of the image is not obtained.

In the recording by using the reaction liquid, from the viewpoint of further improving the abrasion resistance of the image, it is necessary that the anionic group $E_{Pig}$ (µmol/g) of the pigment, the anionic group $E_{Em}$ (µmol/g) of the resin particle and the anionic group $E_{Wax}$ (µmol/g) of the wax particle satisfy the relationship denoted by Formula (3). $E_{Pig}$, $E_{Em}$ and $E_{Wax}$ satisfying the relationship denoted by Formula (3) enables the wax particle in the ink to be more effectively localized on the outermost layer of the image. In this regard, this value represents the density (micromole unit) per unit mass of each component of the anionic group present in each component. An amount of the anionic group may be measured by colloid titration in which a potential difference is utilized. The value of the anionic group may be rephrased with the value of an amount of electric charge or the value of a density for the sake of convenience.

$$E_{Wax} \leq E_{Em} < E_{Pig} \qquad (3)$$

The present inventors conjecture that the reason for the above-described effects being obtained due to Formula (3) being satisfied is as described below. It is said that, of the granular components in the ink, a component containing a smaller amount of anionic group has lower reactivity with the reaction liquid and tends to be localized on the surface of the image. Therefore, the anionic group $E_{Pig}$ (μmol/g) of the pigment can be set to be larger than the anionic group $E_{Em}$ (μmol/g) of the resin particle from the viewpoint of improving the abrasion resistance of the image. Due to this relationship being satisfied, when the ink is brought into contact with the reaction liquid on the recording medium, the pigment having a larger amount of anionic group is strongly aggregated, and thereafter the resin particle is weakly aggregated. As a result, the resin particle covers the aggregated pigment, and it is conjectured that the resin particle having a relatively low friction coefficient tends to be localized on the surface of the image, and the abrasion resistance of the image is further improved.

Likewise, when the anionic group $E_{Wax}$ (μmol/g) of the wax particle is set to be smaller than or equal to the anionic group $E_{Pig}$ (μmol/g) of the pigment and the anionic group $E_{Em}$ (μmol/g) of the resin particle, the wax particle tends to be localized on the surface of the image. In this regard, to further improve the abrasion resistance of the image, the wax particle can be localized on the surface of the image to a degree higher than or equal to the resin particle. Accordingly, it is important that the anionic group $E_{Wax}$ (μmol/g) of the wax particle is smaller than or equal to the anionic group $E_{Em}$ (μmol/g) of the resin particle. When Formula (3) above is not satisfied, a component localized on the surface of the image is changed, and the abrasion resistance of the image is not obtained.

Ink Jet Recording Method and Ink Jet Recording Apparatus

The ink jet recording method according to the present disclosure is a method in which an aqueous ink and an aqueous reaction liquid are ejected from a recording head of an ink jet system by an action of thermal energy and provided to a recording medium so as to print an image. The ink jet recording method according to the present disclosure includes a reaction-liquid-providing step, an ink-providing step and a heating step. The reaction-liquid-providing step is a step of providing the recording medium with the aqueous reaction liquid. The ink-providing step is a step of providing the aqueous ink so that the aqueous ink overlaps at least a portion of a region of the recording medium to be provided with the aqueous reaction liquid. The heating step is a step of heating the recording medium provided with the aqueous ink and the aqueous reaction liquid to a predetermined heating temperature $T_F$ (° C.). The aqueous ink contains a pigment dispersed by an action of an anionic group, a resin particle and a wax particle. The aqueous reaction liquid contains a reaction agent that reacts with the aqueous ink. In addition, the heating temperature $T_F$ (° C.), a glass transition temperature $T_G$ (° C.) of the resin particle and a melting point $T_M$ (° C.) of the wax particle satisfy a relationship denoted by Formula (1). An average particle diameter $D_{Pig}$ (nm) of the pigment and an average particle diameter $D_{Wax}$ (nm) of the wax particle satisfy a relationship denoted by Formula (2). An anionic group $E_{Pig}$ (μmol/g) of the pigment, an anionic group $E_{Em}$ (μmol/g) of the resin particle and an anionic group $E_{Wax}$ (μmol/g) of the wax particle satisfy a relationship denoted by Formula (3). In this regard, there is no need of providing a step of curing the image by applying active energy or the like.

$$T_M > T_F \geq (T_G - 10) \qquad (1)$$

$$4.00 \geq (D_{Wax}/D_{Pig}) \geq 0.70 \qquad (2)$$

$$E_{Wax} \leq E_{Em} < E_{Pig} \qquad (3)$$

The ink jet recording apparatus according to the present disclosure is an apparatus used for an ink jet recording method in which an aqueous ink and an aqueous reaction liquid are ejected from a recording head of an ink jet system by an action of thermal energy and provided to a recording medium so as to print an image. The ink jet recording apparatus according to the present disclosure is an apparatus suitable for use in the above-described recording method.

The ink jet recording method and the ink jet recording apparatus (hereafter also simply referred to as "recording method and recording apparatus") according to the present disclosure will be described below in detail.

Figure 2:
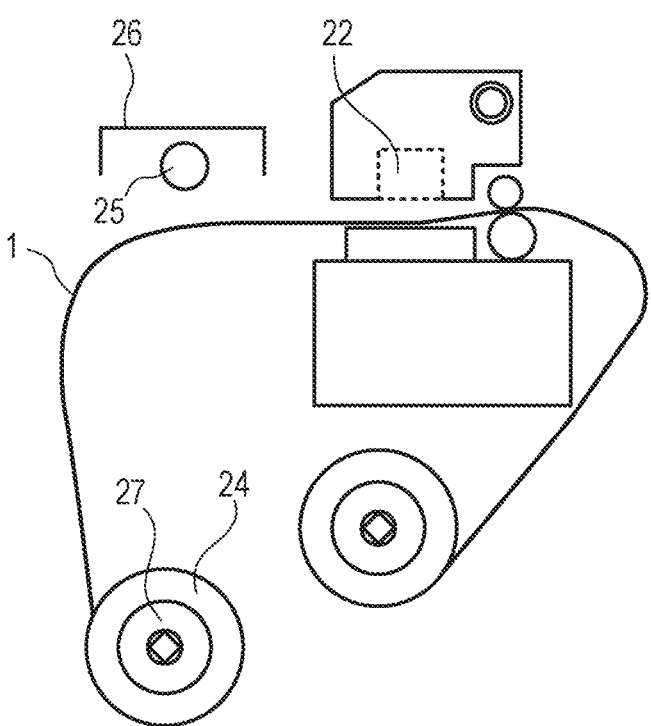
FIG. 2 is a schematic side view illustrating an embodiment of an ink jet recording apparatus according to the present disclosure.

FIG. 1 is a schematic perspective view illustrating an embodiment of the ink jet recording apparatus according to the present disclosure. FIG. 2 is a schematic side view illustrating an embodiment of the ink jet recording apparatus according to the present disclosure. The recording apparatus according to the embodiment illustrated in FIG. 1 and FIG. 2 includes a recording head 22 of an ink jet system that ejects an ink. The recording head 22 is a recording head that ejects an ink (a reaction liquid) by an action of thermal energy. The recording head that ejects an ink by an action of thermal energy is a thermal system recording head in which thermal energy is provided to an ink by applying an electric pulse to an electrothermal conversion element so as to eject the ink from an ejection opening. Herein, the recording head that ejects an ink by an action of thermal energy is described as an example, but a recording head that ejects an ink by an action of mechanical energy may be adopted. Since the recording head 22 can eject an ink and a reaction liquid, it can be said that the recording head 22 includes an ink-providing unit and a reaction-liquid-providing unit. The recording head may include a mechanism (temperature adjustment mechanism) that heats an aqueous ink to be ejected from the recording head. When the temperature adjustment mechanism is included, the temperature of the ink ejected from the recording head can be set to be 35° C. or higher to 70° C. or lower.

Heating Step

The recording method according to the present disclosure includes the heating step of heating (heat-treating) the recording medium provided with the ink and the reaction liquid to a predetermined heating temperature $T_F$ (° C.). The recording medium provided with the ink and the reaction liquid being heated enables an image having excellent abrasion resistance to be printed since not only drying is accelerated but also film formation of the resin particle is accelerated.

There is no particular limitation regarding the unit configured to heat the recording medium, and examples of the heating unit include known temperature-increasing units, such as heaters, and air-blowing units, such as dryers, that utilize air blowing and units in which these are combined. That is, the ink jet recording apparatus includes a mechanism (heating unit) configured to heat the recording medium provided with the ink to the temperature $T_F(^\circ$ C.). Examples of the heating unit include the above-described temperature-increasing units and air-blowing units and units in which these are combined. Examples of the heat-treating method include a method in which heat is applied from an opposite side (back surface) of the recording surface (surface provided with the ink) of the recording medium by using a heater or the like, a method in which warm air or hot air is blown to the recording surface of the recording medium and a method in which heating is performed from the recording surface or the back surface by using an infrared heater. In this regard, a plurality of these may be combined. An image can be dried by blowing air to the surface of the recording medium so as to heat the recording medium since the abrasion resistance of the image is improved. That is, the heating step can include a step of blowing air to the surface of the recording medium so as to heat. It is conjectured that water evaporation from the image surface is thereby accelerated, the wax particle is localized on the image surface, the friction coefficient of the image surface is decreased, and the abrasion resistance of the image is further improved.

It is sufficient that the heating temperature of the recording medium provided with the ink and the reaction liquid satisfies Formulae (1) and (2) above. Particularly, since the abrasion resistance of the image is improved, the heating temperature of the recording medium provided with the ink and the reaction liquid can be set to be 50° C. or higher to 90° C. or lower. Herein, the heating temperature of the recording medium provided with the ink and the reaction liquid may be rephrased with a surface temperature of the printed image or a temperature reached by heating of the recording medium provided with the ink and the reaction liquid. For example, the heating temperature of the recording medium can also be determined as the set temperature for heating the inkjet recording apparatus. The heating temperature of the recording medium provided with the ink and the reaction liquid may be read by a sensor incorporated at a position corresponding to the heating unit of the recording apparatus, or determined from the relationship between a quantity of heat predetermined in accordance with the ink and the type of the recording medium and the temperature of the recording medium.

In the recording apparatus illustrated in FIG. 1 and FIG. 2, a heater 25 supported by a frame (not illustrated in the drawing) is disposed at a position downstream, in a sub-scanning direction A, of a position at which the recording head 22 reciprocally scans in a main scanning direction B. A recording medium 1 provided with the ink is heated by the heater 25. Specific examples of the heater 25 include sheathed heaters and halogen heaters. The heater 25 is covered with a heater cover 26. The heater cover 26 is a member configured to effectively radiate the heat generated from the heater 25 to the recording medium 1. Further, the heater cover 26 is also a member configured to protect the heater 25. The recording medium 1 provided with the ink ejected from the recording head 22 is taken up by a take-up spool 27 so as to form a roll-like rolled medium 24.

Recording Medium

In the recording method and the recording apparatus according to the present disclosure, ink jet exclusive paper (glossy paper, mat paper and the like) having an ink receiving layer; "low-absorbent recording media" such as plain paper having no coat layer; and nonabsorbent recording media (low-absorbent to nonabsorbent recording media) may be used as the recording medium. The nonabsorbent recording medium is a recording medium that exhibits an amount of water absorbed in 30 $msec^{1/2}$ from the start of contact being 10 $mL/m^2$ or less in accordance with the Bristow method described in Standard No. 51 "Paper and Paperboard-Liquid Absorbency Test Method" of JAPAN TAPPI Paper and Pulp Test Methods. In the present disclosure, a recording medium satisfying the above-described condition of an amount of water absorbed is denoted as "low-absorbent to nonabsorbent recording medium". The recording medium for ink jet recording (glossy paper, mat paper and the like) having an ink receiving layer formed from inorganic particle and plain paper having no coat layer are "absorbent recording media" that exhibit the above-described amount of water absorbed being more than 10 $mL/m^2$.

The nonabsorbent recording medium can be used since an image having further improved abrasion resistance is printed. It is conjectured that the ink being brought into contact with the reaction liquid on the nonabsorbent recording medium increases a time for localizing the wax particle on the image surface, enables a sufficient amount of wax particle to be localized on the image surface, and further improves the abrasion resistance of the image.

Regarding the low-absorbent to nonabsorbent recording media, plastic films; recording media in which a plastic film is bonded to a recording surface of a substrate; recording media in which an organic resin coat layer is disposed on a recording surface of a substrate containing cellulose pulp and the like may be used. Of these, plastic films can be used, and recording media in which an organic resin coat layer serving as an organic resin layer is disposed on a recording surface of a substrate containing cellulose pulp can also be used.

When the ink, described later, used for the recording method and the recording apparatus according to the present disclosure is provided to a nonabsorbent recording medium, components such as water and an water-soluble organic solvent are evaporated so that the resin particle is concentrated. Consequently, fusion between the concentrated resin particle is accelerated, and the abrasion resistance of the printed image is further improved. On the other hand, when the ink is provided to a recording medium having high absorbency with respect to a liquid component, since fusion between the resin particle is not readily accelerated, the effect of improving the abrasion resistance of the image is not limited to being sufficiently obtained. In this regard, the recording medium in the present specification denotes rather a recording medium that serves as a printed subject and that is a target of recording of an image than a transfer body.

Reaction Liquid

The recording method according to the present disclosure includes a reaction-liquid-providing step of providing the recording medium with the aqueous reaction liquid containing a reaction agent that reacts with the aqueous ink. In particular, the reaction-liquid-providing step can be performed before the ink-providing step, or the ink-providing step and the reaction-liquid-providing step can be performed in parallel. Each component used for the reaction liquid and the like will be described below in detail.

Reaction Agent

The reaction liquid reacts with the ink due to contact with the ink so as to aggregate components (components, such as a resin and a self-dispersible pigment, that have an anionic group) in the ink and contains the reaction agent. Examples of the reaction agent include organic acids, polyvalent metal salts and cationic resin.

The reaction agent can contain cationic resin and at least one of an organic acid and a polyvalent metal salt since the image having further improved abrasion resistance is printed. The polyvalent metal salt and the organic acid have a small atom size or molecular size compared with the cationic resin so that a diffusion rate into the ink is large. Consequently, when contact with the ink containing a pigment, a resin particle and a wax particle in which amounts of anionic group differ from each other occurs, the polyvalent metal salt and the organic acid that have a large diffusion rate promptly react with the pigment having a large amount of anionic group. Thereafter, the cationic resin having a large diffusion rate reacts with the wax particle having a small amount of anionic group. Therefore, it is conjectured that the wax particle is more readily localized on the image surface and that the abrasion resistance of the image is further improved.

Organic Acid

The reaction liquid containing the organic acid has buffer capacity in an acidic region (pH of less than 7.0, preferably pH of 2.0 to 5.0), and thereby the anionic group of the component present in the ink is efficiently made into an acid type and is aggregated. Examples of the organic acid include monocarboxylic acids, such as formic acid, acetic acid, propionic acid, butyric acid, benzoic acid, glycolic acid, lactic acid, salicylic acid, pyrrolecarboxylic acid, furanecarboxylic acid, picolinic acid, nicotinic acid, thiophenecarboxylic acid, levulinic acid and coumaric acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts or hydrogen salts thereof; tricarboxylic acids, such as citric acid and trimellitic acid, and salts or hydrogen salts thereof; and tetracarboxylic acids, such as pyromellitic acid, and salts or hydrogen salts thereof. The content (% by mass) of the organic acid in the reaction liquid can be 1.0% by mass or more to 50.0% by mass or less based on a total mass of the reaction liquid.

Polyvalent Metal Salt

The polyvalent metal salt is a compound composed of a divalent or higher metal ion (polyvalent metal ion) and an anion. The polyvalent metal salt is dissociated in the reaction liquid so as to become a polyvalent metal ion and aggregates the pigment and the like dispersed by an action of an anionic group in the ink. Examples of the polyvalent metal ion include divalent metal ions, such as $Ca^{2+}$, $Cu^{2+}$, $Ni^{2+}$, $Mg^{2+}$, $Sr^{2+}$, $Ba^{2+}$ and $Zn^{2+}$, and trivalent metal ions, such as $Fe^{3+}$, $Cr^{3+}$, $Y^{3+}$ and $Al^{3+}$. Examples of the anion constituting the polyvalent metal salt include inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$, and $H_2PO_4^-$; and organic anions, such as $HCOO^-$, $(COO^-)_2$, $COOH(COO^-)$, $CH_3COO^-$, $C_2H_5COO^-$, $CH_3CH(OH)COO^-$, $C_2H_4(COO^-)_2$, $C_6H_5COO^-$, $C_6H_4(COO^-)_2$ and $CH_3SO_3^-$.

Specific examples of the polyvalent metal salt include calcium carbonate such as calcium carbonate heavy and calcium carbonate light, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, aluminum sulfate, calcium methanesulfonate, calcium lactate, magnesium lactate, calcium propionate, calcium acetate, calcium pantothenate and calcium gluconate. The polyvalent metal salt may contain hydrated water. The content (% by mass) of the polyvalent metal salt in the reaction liquid can be 1.0% by mass or more to 20.0% by mass or less based on a total mass of the reaction liquid. In the present specification, "content (% by mass) of the polyvalent metal salt" in the reaction liquid when the polyvalent metal salt is a hydrate denotes "content (% by mass) of anhydride of the polyvalent metal salt" where water serving as the hydrate is excluded.

Cationic Resin

The cationic resin has a cationic section in a resin structure and aggregates the pigment and the like dispersed by an action of a carboxylic acid group in the ink. Examples of the cationic resin include resin having a structure of a primary to tertiary amine and resin having a structure of a quaternary amine salt. Specific examples include a vinylamine, an allylamine, vinylimidazole, vinylpyridine, dimethylaminoethyl methacrylate, ethyleneimine, guanidine, diallyldimethylammonium chloride and resin having a structure of an alkylamine-epichlorohydrin condensate. To improve solubility in the reaction liquid, the cationic resin and the acid compound may be used in combination, or quaternization treatment of the cationic resin may be performed. The content (% by mass) of the cationic resin in the reaction liquid can be 0.1% by mass or more to 10.0% by mass or less based on a total mass of the reaction liquid.

Aqueous Medium

The reaction liquid is an aqueous reaction liquid containing at least water as an aqueous medium. Examples of the aqueous medium used for the reaction liquid include a medium akin to the aqueous medium, described later, capable of being contained in the ink.

Other Components

The reaction liquid may contain various types of other components, as the situation demands. Examples of the other components include components akin to the other components, described later, capable of being contained in the ink.

Physical Property of Reaction Liquid

A reaction liquid suitable for use in the recording method according to the present disclosure is an aqueous reaction liquid applied to the ink jet system. Therefore, from the viewpoint of reliability, physical properties thereof can be appropriately controlled. Specifically, the surface tension of the reaction liquid at 25° C. can be 20 mN/m or more to 60 mN/m or less. In addition, the viscosity of the reaction liquid at 25° C. can be 1.0 mPa·s or more to 10.0 mPa·s or less. The pH of the reaction liquid at 25° C. is preferably 5.0 or more to 9.5 or less and more preferably 6.0 or more to 9.0 or less.

Ink

The ink used for the recording method according to the present disclosure is an ink jet aqueous ink containing a pigment dispersed by an action of an anionic group, a resin particle and a wax particle. Each component and the like constituting the ink will be described below in detail.

Pigment

The ink contains a pigment serving as a coloring material. The pigment is dispersed by an action of the anionic group and is aggregated by a reaction agent in the reaction liquid. The content (% by mass) of the pigment in the ink is preferably 0.1% by mass or more to 15.0% by mass or less and further preferably 1.0% by mass or more to 10.0% by mass or less based on a total mass of the reaction liquid.

Specific examples of the pigment include inorganic pigments, such as carbon black and titanium oxide; and organic pigments, such as azo, phthalocyanine, quinacridone, isoindolinone, imidazolone, diketopyrrolopyrrole and dioxadine.

Regarding a dispersion system of the pigment, a resin-dispersed pigment using resin (resin dispersant) as a dispersant, a self-dispersible pigment in which a hydrophilic group is bonded to a particle surface of the pigment and the like may be used. In addition, for example, a resin-bonded pigment in which an organic group containing resin is chemically bonded to a particle surface of the resin and a microcapsule pigment in which a particle surface of the pigment is covered with resin or the like may be used. In particular, the resin-dispersed pigment in which resin serving as a dispersant is physically adsorbed to the particle surface of the pigment rather than the resin-bonded pigment or the microcapsule pigment can be used. That is, the pigment can be the pigment dispersed by an action of the resin dispersant.

Regarding the resin dispersant for dispersing the pigment in the aqueous medium, a resin dispersant capable of dispersing the pigment in the aqueous medium by an action of the anionic group can be used. Regarding the resin dispersant, resin described later, in particular water-soluble resin, may be used. The content (% by mass) of the pigment in the ink can be 0.3 times or more to 10.0 times or less the content of the resin dispersant on a mass ratio basis.

Regarding the self-dispersible pigment, the pigment in which an anionic group, such as a carboxylic acid group, a sulfonic acid group or a phosphonic acid group, is bonded to a particle surface of the pigment directly or through another atomic group (—R—) may be used. The anionic group may be any one of an acid type and a salt type. In the instance of the salt type, any one of a state in which the salt is partly dissociated and a state in which the salt is entirely dissociated. When the anionic group is the salt type, examples of a cation serving as a counter ion include an alkali metal cation, ammonium and organic ammonium. Specific examples of the other atomic group (—R—) include a straight chain or branched alkylene group having the carbon number of 1 to 12; arylene groups, such as a phenylene group and a naphthylene group; a carbonyl group; an imino group; an amide group; a sulfonyl group; an ester group; and an ether group. In addition, the group may be a combination of these groups.

Resin Particle

The ink contains a resin particle. From the viewpoint of recording an image having excellent abrasion resistance, it is necessary that the heating temperature $T_F$ (° C.) of the recording medium provided with the ink and the reaction liquid and the glass transition temperature $T_G$ (° C.) of the resin particle satisfy a relationship denoted by Formula (6). $T_F$(° C.) and $T_G$ (° C.) satisfying the relationship denoted by Formula (6) enables the resin particle to be sufficiently made into a cover film so as to improve the abrasion resistance of the image. The glass transition temperature $T_G$ (° C.) of the resin particle is preferably 40° C. or higher to 120° C. or lower and further preferably 50° C. or higher to 100° C. or lower. The glass transition temperature $T_G$ (° C.) of the resin particle may be measured using a differential scanning calorimeter (DSC).

$$T_F \geq (T_G - 10) \qquad (6)$$

The anionic group (μmol/g) of each of the pigment, the resin particle and the wax particle described later may be determined by colloid titration. In Example described later, the anionic group (μmol/g) was measured by the colloid titration in which Automatic Potentiometric Titrator (AT-510; produced by Kyoto Electronics Manufacturing Co., Ltd.) incorporated with Particle Charge Detection Unit (PCD-500) was used and a potential difference was utilized. During the measurement, the pH of each of a pigment dispersion liquid, a water dispersion liquid of the resin particle and a water dispersion liquid of the wax particle was adjusted to 8 to 9. In this regard, methyl glycol chitosan was used as a titrant.

The content (% by mass) of the resin particle in the ink is preferably 0.1% by mass or more to 15.0% by mass or less and further preferably 1.0% by mass or more to 10.0% by mass or less based on a total mass of the reaction liquid. The content (% by mass) of the resin particle in the ink can be 0.5 times or more, preferably 1.5 times or more, and particular preferably 1.7 times or more the content (% by mass) of the pigment on a mass ratio basis. In addition, the mass ratio is preferably 10.0 times or less. The resin particle in a dispersion state, that is, in a form of a resin emulsion, is present in the ink.

In the present specification, "resin particle" denotes resin present in a state of not being dissolved in the aqueous medium in the ink and, more specifically, denotes resin capable of being present, in the aqueous medium, in a state in which particle is formed so that the particle diameter is measurable by a dynamic light scattering method. On the other hand, "water-soluble resin" denotes resin present in a state of being dissolved in the aqueous medium in the ink.

Whether some resin corresponds to "resin particle" may be determined in accordance with a method described below. Initially, a liquid containing a target resin of determination is prepared, and a sample is prepared by performing dilution with pure water so that the content of the resin is set to be about 1.0%. Subsequently, a particle diameter of the resin in the sample is measured by a dynamic light scattering method, and when a particle having a particle diameter is measured, it is determined that the resin is "resin particle" (that is, the resin is "water-dispersible resin"). On the other hand, when a particle having a particle diameter is not measured, it is determined that the resin is not "resin particle" (that is, the resin is "water-soluble resin"). The measurement conditions in such an instance may be set to be, for example, SetZero: 30 sec, the number of times of measurement: 10, measurement time: 120 sec, shape: spherical shape, refractive index: 1.5 and density: 1.0.

Regarding a particle size distribution measuring apparatus, a particle size analyzer in accordance with a dynamic light scattering method (for example, trade name "Nanotrac WAVE II-Q" produced by MicrotracBEL Corp.) and the like may be used. As a matter of course, the particle size distribution measuring apparatus to be used, the measurement conditions, and the like are not limited to the above.

The acid value of the resin constituting the resin particle can be 5 mgKOH/g or more to 100 mgKOH/g or less. The weight average molecular weight of the resin constituting the resin particle is preferably 1,000 or more to 3,000,000 or less and further preferably 100,000 or more to 3,000,000 or less. The average particle diameter of the resin particle measured by the dynamic light scattering method can be 50 nm or more to 500 nm or less. The resin particle is not limited to including a coloring material.

Wax Particle

The ink contains particle formed of wax (wax particle). The ink containing the wax being used enables the image having further improved abrasion resistance to be printed. The wax may be a composition including a component other than the wax or the wax itself. The wax particle may be dispersed by a dispersant such as a surfactant, a water-soluble resin or the like. Only one type of the wax may be used, or two or more types thereof may be used in combination. The content (% by mass) of the wax particle in the ink is preferably 0.1% by mass or more to 10.0% by mass or less and further preferably 1.0% by mass or more to 5.0% by mass or less based on a total mass of the ink.

The wax is an ester of a water-insoluble monohydric or dihydric higher alcohol and a fatty acid in a narrow sense and includes animal-based wax and plant-based wax. But oils and fats are not included. In a broad sense, fats having a high melting point, mineral-based wax, petroleum-based wax, and compounds and modified materials of various wax. Regarding the recording method according to the present disclosure, the wax in a broad sense is used without limitation. The wax in a broad sense is classified into natural wax, synthetic wax, compounds thereof (compound wax) and modified materials thereof (modified wax).

Examples of the natural wax include animal-based wax, plant-based wax, mineral-based wax and petroleum-based wax. Examples of the animal-based wax include beeswax, spermaceti and wool wax (lanolin). Examples of the plant-based wax include palm wax, carnauba wax, candelilla wax, rice wax, Japan wax, ouricury wax and sugarcane wax. Examples of the mineral-based wax include montan wax, ozocerite, ceresin and lignite wax. Examples of the petroleum wax include paraffin, microcrystalline and petrolatum.

Examples of the synthetic wax include hydrocarbon-based wax, such as Fischer-Tropsch wax and polyolefin wax (for example, polyethylene wax and polypropylene wax). The compound wax is a mixture of the above-described various wax. The modified wax is wax produced by subjecting the above-described various wax to modification treatment, such as oxidation, hydrogenation, alcohol modification, acrylic modification or urethane modification. Examples of the modified wax include paraffin wax derivatives, montan wax derivatives and microcrystalline wax derivatives. Examples of the hydrogenated wax include CASTER WAX and opal wax.

A material constituting the wax particle can be Fischer-Tropsch wax. That is, the wax can be Fischer-Tropsch wax. The wax particle formed of Fischer-Tropsch wax being used enables the image having further improved abrasion resistance to be printed. Since Fischer-Tropsch wax is rich in saturated straight-chain hydrocarbon, and steric hindrance is small compared with other wax. Accordingly, when the surface of an image printed by using the ink containing the wax particle formed of Fischer-Tropsch wax is rubbed, the wax particle is readily extended. Therefore, it is conjectured that the image surface being rubbed a plurality of times enables the friction coefficient of the image surface to be more efficiently decreased and that the abrasion resistance of the image is further improved.

From the viewpoint of recording an image having excellent abrasion resistance, it is necessary that the heating temperature $T_F$ (° C.) of the recording medium provided with the ink and the reaction liquid and the melting point $T_M$ (° C.) of the wax particle satisfy a relationship denoted by Formula (7). $T_F$ (° C.) and $T_M$ (° C.) satisfying the relationship denoted by Formula (7) enables the wax to be present in a form of particle in the image without the wax being melted even at the heating temperature $T_F$ (° C.). The melting point (° C.) of the wax is preferably 40° C. or higher to 120° C. or lower and further preferably 50° C. or higher to 100° C. or lower. The melting point $T_M$ (° C.) of the wax particle is a top temperature of an endothermic peak during a temperature increase process of a differential scanning calorimeter (DSC). Regarding the differential scanning calorimeter (DSC), for example, trade name "DSC-60" (produced by SHIMADZU CORPORATION) may be used. In this regard, the melting point of the wax tends to be influenced by characteristics, such as a molecular weight (higher melting point with increasing molecular weight), a molecular structure (straight chain leads to high melting point and branch decreases melting point), crystallinity (higher melting point with increasing crystallinity) and a density (higher melting point with increasing density). Consequently, controlling these characteristics enables the wax to have a predetermined melting point.

$$T_M > T_F \tag{7}$$

The anionic group $E_{Wax}$ (μmol/g) of the wax particle can be 50 μmol/g or more to 90 μmol/g or less. The anionic group $E_{Wax}$ (μmol/g) of the wax particle being set to be 90 μmol/g or less enables the wax particle to be more readily exposed at the image surface and enables the abrasion resistance of the image to be further improved. On the other hand, when the anionic group $E_{Wax}$ (μmol/g) of the wax particle is excessively small, the reaction agent in the reaction liquid is not limited to readily reacting with the wax particle. Consequently, the wax particle is readily gathered on the image surface due to heating, and a large cluster of the wax particle may be formed so that the color developability of the image is not limited to being obtained. Accordingly, from the viewpoint of improving the color developability of the image, the anionic group $E_{Wax}$ (μmol/g) of the wax particle can be 50 μmol/g or more. An amount of the anionic group of the wax particle may be adjusted by, for example, the type and the amount of the dispersant for dispersing the wax and oxidation treatment of the wax itself.

It is necessary that the average particle diameter $D_{Pig}$ (nm) of the pigment and the average particle diameter $D_{Wax}$ (nm) of the wax particle satisfy the relationship denoted by Formula (2). $D_{Pig}$ (nm) and $D_{Wax}$ (nm) satisfying the relationship denoted by Formula (2) enables the image having the characteristics of excellent abrasion resistance and excellent color developability in combination to be printed.

$$4.00 \geq \left(D_{Wax}/D_{Pig}\right) \geq 0.70 \tag{2}$$

From the viewpoint of further improving the color developability of the image, the value of "$D_{Wax}/D_{Em}$" can be 3.00 or less. In addition, from the viewpoint of further improving the abrasion resistance of the image, the value of "$D_{Wax}/D_{Em}$" can be 1.00 or more. That is, the average particle diameter $D_{Em}$ (nm) of the resin particle and the average particle diameter $D_{Wax}$ (nm) of the wax particle can satisfy a relationship denoted by Formula (4).

$$3.00 \geq \left(D_{Wax}/D_{Em}\right) \geq 1.00 \tag{4}$$

The average particle diameter $D_{Wax}$ (nm) of the wax particle can be 100 nm or more to 200 nm or less. The average particle diameter $D_{Wax}$ (nm) of the wax particle being 100 nm or more enables the wax particle to be more readily exposed at the image surface and enables the abrasion resistance of the image to be further improved. In addition, the average particle diameter $D_{Wax}$ (nm) of the wax particle being 200 nm or less suppresses surface scattering and enables the color developability of the image to be further improved.

In the present specification, simple "average particle diameter" denotes "volume-based cumulative 50% particle diameter ($D_{50}$)". The volume-based cumulative 50% particle diameter of each of the pigment, the resin particle and the wax particle is a diameter of particle when the volume of the particle is accumulated from the small particle side and reaches 50% based on the total volume of the measured particle on a particle diameter cumulative curve. "Volume-based cumulative 50% particle diameter ($D_{50}$)" may be measured using a particle size analyzer in accordance with a dynamic light scattering method (for example, trade name "Nanotrac WAVE II-Q" produced by MicrotracBEL Corp.).

The content $W_{Wax}$ (% by mass) of the wax particle in the ink and the content $W_{Em}$ (% by mass) of the resin particle in the ink can satisfy a relationship denoted by Formula (5). $W_{Wax}$ (% by mass) and $W_{Em}$ (% by mass) satisfying the relationship denoted by Formula (5) enables the wax particle rather than the pigment to be localized on the image surface and enables the abrasion resistance of the image to be further improved.

$$1.3 \leq \left(W_{Em}/W_{Wax}\right) \leq 10.0 \qquad (5)$$

When the value of "$W_{Em}/W_{Wax}$" is less than 1.3, the wax particle may be excessively exposed at the image surface, surface scattering tends to occur, and the color developability of the image is not limited to being sufficiently obtained. On the other hand, when the value of "$W_{Em}/W_{Wax}$" is more than 10.0, the amount of the wax particle exposed at the image surface tends to become insufficient, and an effect of improving the abrasion resistance of the image is not limited to being sufficiently obtained.

Resin

The ink may contain resin. The content (% by mass) of the resin in the ink is preferably 0.1% by mass or more to 20.0% by mass or less and further preferably 0.5% by mass or more to 15.0% by mass or less based on a total mass of the ink.

(i) The ink may be added to the ink to stabilize the dispersion state of the pigment, that is, as a resin dispersant or an auxiliary thereof. In addition, (ii) the resin may be added to the ink to improve various characteristics of the printed image. Examples of the form of the resin include a block copolymer, a random copolymer and a graft copolymer and a combination thereof. In this regard, the resin may be a water-soluble resin that is dissolved in an aqueous medium or a resin particle that is dispersed in an aqueous medium. Only one type of the resin may be used, or two or more types thereof may be used in combination.

Composition of Resin

Examples of the resin include acrylic resins, urethane-based resins and olefin-based resins. Of these, acrylic resins and urethane-based resins can be used, and, in particular, acrylic resins composed of a unit derived from (meth)acrylic acid or (meth)acrylate can be used.

The acrylic resins can have a hydrophilic unit and a hydrophobic unit as constituent units. Of these, resin having a hydrophilic unit derived from (meth)acrylic acid and a hydrophobic unit derived from at least one selected from the group consisting of monomers having an aromatic ring and (meth)acrylic acid ester-based monomers can be used. In particular, the resin having a hydrophilic unit derived from (meth)acrylic acid and a hydrophobic unit derived from at least one monomer selected from the group consisting of styrene and α-methylstyrene can be used. Such resin is suitable for use as a resin dispersant to disperse the pigment since an interaction with the pigment tends to occur.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group include acidic monomers having a carboxylic acid group, such as (meth)acrylic acid, itaconic acid, maleic acid and fumaric acid, and anionic monomers, such as, anhydrides or salts of these acidic monomers. Examples of the cation constituting the salt of the acidic monomer include ions of lithium, sodium, potassium, ammonium, organic ammonium and the like. The hydrophobic unit is a unit having no hydrophilic group such as an anionic group. The hydrophobic unit may be formed by, for example, polymerizing a hydrophobic monomer having no hydrophilic group such as an anionic group. Specific examples of the hydrophobic monomer include monomers having an aromatic ring, such as styrene, α-methylstyrene and benzyl (meth)acrylate; and (meth) acrylic acid ester-based monomers, such as methyl (meth) acrylate, butyl (meth)acrylate and 2-ethylhexyl (meth)acrylate.

The urethane-based resin may be obtained by, for example, reacting a polyisocyanate with a polyol. In addition, a chain extender may be further reacted. Examples of the olefin-based resin include polyethylenes and polypropylenes.

Property of Resin

The acid value of the water-soluble resin can be 100 mgKOH/g or more to 250 mgKOH/g or less. The weight average molecular weight of the water-soluble resin can be 3,000 or more to 15,000 or less.

Aqueous Medium

The ink used for the recording method according to the present disclosure is an aqueous ink containing at least water as an aqueous medium. The ink may contain an aqueous medium that is water or a solvent mixture of water and a water-soluble organic solvent. Regarding the water, deionized water or ion-exchanged water can be used. The content (% by mass) of the water in the ink can be 50.0% by mass or more to 95.0% by mass or less based on a total mass of the ink. The content (% by mass) of the water-soluble organic solvent in the ink can be 3.0% by mass or more to 50.0% by mass or less based on a total mass of the ink. Regarding the water-soluble organic solvent, any solvent usable for an ink jet ink, such as alcohols, (poly)alkylene glycols, glycol ethers, nitrogen-containing solvents and sulfur-containing solvents, may be used. Only one type of the water-soluble organic solvents may be used, or two or more types thereof may be used in combination.

Other Component

The ink may contain various other components, as the situation demands. Examples of the other components include various additives, such as an antifoaming agent, a surfactant, a pH adjuster, a viscosity adjuster, a rust inhibitor, a preservative, a fungicide, an antioxidant and a reducing inhibitor. However, the ink can contain no reaction agent that is contained in the reaction liquid.

Physical Property of Ink

The ink is an aqueous ink applied to the ink jet system. Therefore, from the viewpoint of reliability, the physical properties thereof can be appropriately controlled. Specifically, the surface tension of the ink at 25° C. can be 20 mN/m or more to 60 mN/m or less. In addition, the viscosity of the ink at 25° C. can be 1.0 mPa·s or more to 10.0 mPa·s or less. The pH of the ink at 25° C. is preferably 7.0 or more to 9.5 or less and further preferably 8.0 or more and 9.5 or less.

EXAMPLES

The present disclosure will be described below in further detail with reference to the examples and the comparative examples, but the present disclosure is not limited to the following examples within the bounds of not departing from the scope of the present disclosure. The amount of the component expressed in "part" or "%" is on a mass basis, unless otherwise specified.

Method for Measuring Physical Property

Glass Transition Temperature of Resin Particle

A liquid containing resin particle was dried and hardened at 60° C., 2 mg of the resulting resin particle was placed into an aluminum container, and sealing was performed so that a sample for measurement was prepared. The resulting sample was subjected to thermal analysis in accordance with a temperature program described below by using a differential scanning calorimeter (trade name "DSC-2500" produced by TA instruments). The glass transition temperature of the resin in the present specification is defined as described below. That is, on a temperature increase curve (horizontal axis: temperature and vertical axis: calorie) of a temperature program (3) below, a temperature at an intersection point of a straight line that passes two points on the low-temperature side of the curve and that is extended to the high-temperature side and a tangent drawn at a point at which the gradient of a step change portion is the maximum on the curve is determined. The thus determined temperature was denoted by "glass transition temperature ($T_G$) of resin particle".

Temperature Program
(1) Increasing temperature from 20° C. to 200° C. at 10° C./min
(2) Decreasing temperature from 200° C. to –50° C. at 5° C./min
(3) Increasing from –50° C. to 200° C. at 10° C./min Melting Point of Wax Particle A liquid containing wax particle was dried and hardened at 60° C., 2 mg of the resulting wax particle was placed into an aluminum container, and sealing was performed so that a sample for measurement was prepared. The resulting sample was subjected to thermal analysis in accordance with a temperature program described below by using the above-described differential scanning calorimeter. The melting point $T_M$ (° C.) in the present specification was a top temperature of an endothermic peak in accordance with a temperature program (3) below.

Temperature Program
(1) Increasing temperature from 20° C. to 150° C. at 10° C./min
(2) Decreasing temperature from 150° C. to 20° C. at 10° C./min
(3) Increasing temperature from 20° C. to 150° C. at 10° C./min Determination Whether Resin is Resin Particle and Average Particle Diameters of Wax Particle and Resin Particle A liquid containing the resin was diluted with ion-exchanged water so that a sample having a resin content of about 1.0% was prepared. Regarding the resulting sample, an average particle diameter $D_{Em}$ (volume-based cumulative 50% particle diameter) of the resin particle was measured using a particle size analyzer in accordance with a dynamic light scattering method under the conditions described below.

Regarding the particle size analyzer, trade name "Nanotrac WAVE II-Q" (produced by MicrotracBEL Corp.) was used. When a particle having a particle diameter was measured by this measuring method, it was determined that the resin was "resin particle" (the resin was "water-dispersible resin"). On the other hand, when a particle having a particle diameter was not measured, it was determined that the resin was not "resin particle" (the resin was "water-soluble resin"). An average particle diameter $D_{Wax}$ (volume-based cumulative 50% particle diameter) of the wax particle was measured performing the operation akin to the above except that a liquid containing the wax particle was used instead of the liquid containing the resin when the particle diameter of the wax particle was measured. The measurement conditions in such an instance were set to be SetZero: 30 s, the number of times of measurement: 3, measurement time: 120 sec, shape: spherical shape, refractive index: 1.6 and density: 1.0.

Average Particle Diameter of Pigment

A pigment dispersion liquid was diluted with ion-exchanged water so that a sample having a pigment content of about 0.01% was prepared. Regarding the resulting sample, an average particle diameter $D_{Pig}$ (volume-based cumulative 50% particle diameter) of the pigment was measured using the above-described particle size analyzer under the conditions described below. The measurement conditions in such an instance were set to be SetZero: 30 s, the number of times of measurement: 3, measurement time: 120 sec, shape: nonspherical shape, refractive index: 1.5 and density: 1.0. In this regard, when an average particle diameter of carbon black was measured, a refractive index was set to be 1.8.

Preparation of Reaction Liquid

Each reaction liquid was prepared by mixing each component (unit: %) presented in Table 1, performing sufficient agitation, and performing pressure filtration with a cellulose acetate filter having a pore size of 3.0 μm (produced by ADVANTEC). In Table 1, "Catiomaster PD-7" is a trade name of an amine-epichlorohydrin condensation-type polymer aqueous solution (cationic resin content: 50.0%) produced by Kawaken Fine Chemicals Co., Ltd. In addition, "BYK349" is a trade name of a silicone-based surfactant produced by BYK Japan KK.

TABLE 1

| Composition of reaction liquid | | | | | |
| --- | --- | --- | --- | --- | --- |
| | Reaction liquid | | | | |
| | 1 | 2 | 3 | 4 | 5 |
| Succinic acid | | 2.0 | | 2.0 | |
| Magnesium sulfate heptahydrate | 4.1 | | 4.1 | | |
| Catiomaster PD-7 | 1.0 | 1.0 | | | 4.0 |
| 1,2-Butanediol | 15.0 | 15.0 | 15.0 | 15.0 | 15.0 |
| Propylene glycol | 15.0 | 15.0 | 15.0 | 15.0 | 15.0 |
| BYK349 | 1.0 | 1.0 | 1.0 | 1.0 | 1.0 |
| Ion-exchanged water | 63.9 | 66.0 | 64.9 | 67.0 | 65.0 |

Preparation of Pigment Dispersion Liquid

Pigment Dispersion Liquid 1

A styrene-ethyl acrylate-acrylic acid copolymer (Resin 1) having an acid value of 150 mgKOH/g and a weight average molecular weight of 8,000 was prepared. A Resin 1 aqueous solution having a resin (solid content) content of 20.0% was prepared by neutralizing 20.0 parts of Resin 1 with equimolar potassium hydroxide, on an acid value basis, and adding an appropriate amount of pure water. A mixture was obtained by mixing 20.0 parts of carbon black (trade name "MCF88" produced by Mitsubishi Chemical Corporation), 30.0 parts of Resin 1 aqueous solution and 50.0 parts of ion-exchanged water. The resulting mixture was subjected to dispersion treatment at a pressure of 150 MPa by using Nanomizer (produced by YOSHIDA KIKAI CO., LTD.) with the number of passes presented in a lower column in Table 1. After coarse particle was removed by performing centrifugal separation at a rotational speed of 5,000 rpm for 30 min, pressure filtration with a cellulose acetate filter having a pore size of 3.0 μm (produced by ADVANTEC) was performed. Dilution was performed by adding an appropriate amount of ion-exchanged water so that Pigment dispersion liquid 1 having a pigment content of 10.0% and a Resin 1 (resin dispersant) content of 3.0% was obtained. The anionic group of the pigment in Pigment dispersion liquid 1 was 398 μmol/g.

Pigment Dispersion Liquids 2 to 11

Pigment dispersion liquids 2 to 11 were prepared in the manner akin to that of Pigment dispersion liquid 1 above except that dispersion treatment was performed with a composition (unit: part) presented in an upper column in Table 2 and with the number of passes presented in a lower column in Table 2. "Resin 2 aqueous solution" in Table 2 was prepared as described below. A styrene-ethyl acrylate-polyethylene glycol acrylate (trade name "AE-400" produced by NOF CORPORATION)-acrylic acid copolymer (Resin 2) having an acid value of 25 mgKOH/g and a weight average molecular weight of 8,000 was prepared. A Resin 2 aqueous solution having a resin (solid content) content of 20.0% was prepared by neutralizing 20.0 parts of Resin 2 with equimolar potassium hydroxide, on an acid value basis, and adding an appropriate amount of pure water.

TABLE 2

| Composition and characteristics of pigment dispersion liquid | | | | | | | | | | | |
| --- | --- | --- | --- | --- | --- | --- | --- | --- | --- | --- | --- |
| | Pigment dispersion liquid | | | | | | | | | | |
| | 1 | 2 | 3 | 4 | 5 | 6 | 7 | 8 | 9 | 10 | 11 |
| Carbon black | 10.0 | | | | 10.0 | 10.0 | 10.0 | 10.0 | 10.0 | 10.0 | 10.0 |
| C.I. Pigment Blue 15:3 | | 10.0 | | | | | | | | | |
| C.I. Pigment Red 122 | | | 10.0 | | | | | | | | |
| C.I. Pigment Yellow 74 | | | | 10.0 | | | | | | | |
| Resin 1 aqueous solution | 15.0 | 15.0 | 15.0 | 15.0 | 15.0 | 15.0 | 5.0 | 4.5 | 15.0 | 15.0 | |
| Resin 2 aqueous solution | | | | | | | | | | | 15.0 |
| Ion-exchanged water | 75.0 | 75.0 | 75.0 | 75.0 | 75.0 | 75.0 | 85.0 | 85.5 | 75.0 | 75.0 | 75.0 |
| Number of passes of dispersion treatment | 50 | 50 | 50 | 50 | 10 | 200 | 50 | 50 | 9 | 250 | 50 |
| Pigment average particle diameter $D_{Pig}$ (nm) | 90 | 120 | 120 | 140 | 214 | 50 | 90 | 90 | 220 | 48 | 90 |
| Pigment content P (%) | 10.0 | 10.0 | 10.0 | 10.0 | 10.0 | 10.0 | 10.0 | 10.0 | 10.0 | 10.0 | 10.0 |
| Resin content B (%) | 3.0 | 3.0 | 3.0 | 3.0 | 3.0 | 3.0 | 1.0 | 0.90 | 3.0 | 3.0 | 3.0 |
| B/P value (times) | 0.30 | 0.30 | 0.30 | 0.30 | 0.30 | 0.30 | 0.10 | 0.09 | 0.30 | 0.30 | 0.30 |
| Anionic group of pigment $E_{pig}$ (μmol/g) | 398 | 398 | 398 | 398 | 398 | 398 | 130 | 120 | 398 | 398 | 66 |

Preparation of Water Dispersion Liquid of Resin Particle

Resin Particles 1 to 6

A reactor was charged with 1,160 parts of ion-exchanged water and heating to a polymerization temperature presented in Table 3 was performed. In addition, an initiator solution was prepared by dissolving 1.39 parts of potassium persulfate into 160 parts of ion-exchanged water. Addition of 32 parts of the initiator solution into the reactor and agitation were performed. On the other hand, a monomer solution was prepared by mixing 159.4 parts of ion-exchanged water, monomers types and usages (parts) of which are presented in Table 3, 1.6 parts of isooctyl thioglycolate and 9.98 parts of emulsifier aqueous solution. Regarding the emulsifier, trade name "Rhodafac RS 710" (produced by Rhodia Novecare) was used, and a dispersant aqueous solution having a dispersant content of 30.0% was prepared by adding an appropriate amount of ion-exchanged water and used. A reaction product was obtained by simultaneously dripping the prepared monomer aqueous solution and 129.4 parts of initiator solution into the reactor over 30 min, performing agitation, and thereafter maintaining for 3 hours at the polymerization temperature presented in Table 3. After the resulting reaction product was cooled to 50° C., the pH was adjusted to 8.5 by adding 50% potassium hydroxide aqueous solution. After cooling to room temperature was performed, filtration with a 200 mesh filter was performed. An appropriate amount of ion-exchanged water was added so that a water dispersion liquid having a resin particle content of 30.0% of each of Resin particles 1 to 6 was obtained. The characteristics of the resin particle in the resulting water dispersion liquid is presented in Table 1. The meaning of the abbreviation of the monomer in Table 3 is as described below.

MAA: methacrylic acid

MMA: methyl methacrylate

HMA: hexyl methacrylate nBMA: n-butyl methacrylate

TABLE 3

| Synthesis condition and characteristics of resin particle | | | | | | | |
| --- | --- | --- | --- | --- | --- | --- | --- |
| | | | | | | Characteristics | |
| | Synthesis condition | | | | | Glass | Average | Anionic |
| | | | | | Polymerization | transition | particle | group |
| Resin | Monomer usage (part) | | | | temperature | temperature | diameter | $E_{Em}$ |
| particle | MAA | MMA | HMA | nBMA | (° C.) | $T_G$ (° C.) | $D_{Em}$ (nm) | (μmol/g) |
| 1 | 1.0 | 49.5 | 23.5 | 26.0 | 90 | 70 | 90 | 120 |
| 2 | 0.7 | 49.7 | 23.5 | 26.1 | 90 | 70 | 90 | 80 |
| 3 | 1.0 | 26.0 | 26.0 | 47.0 | 90 | 50 | 90 | 120 |
| 4 | 1.0 | 49.5 | 23.5 | 26.0 | 65 | 70 | 160 | 120 |
| 5 | 1.0 | 49.5 | 23.5 | 26.0 | 70 | 70 | 150 | 120 |
| 6 | 0.6 | 49.7 | 23.5 | 26.2 | 90 | 70 | 90 | 70 |

Preparation of Water Dispersion Liquid of Wax Particle

Wax Particles 1 to 12

Wax was dispersed by mixing each component presented in Table 4 and appropriately adjusting the temperature and the pressure. Dilution was performed by adding an appropriate amount of pure water so as to obtain a water dispersion liquid of each of Wax particles 1 to 12, in which a total content of the wax and the dispersant was 30.0%. The characteristics of the wax particle in the resulting water dispersion liquid are presented in Table 4. The wax in Table 4 will be described below in detail.

Wax 1: Fischer-Tropsch wax

Wax 2: Paraffin wax

Wax 3: Polyethylene wax

Wax 4: Fischer-Tropsch wax

TABLE 4

| | | | | | | | |
|---|---|---|---|---|---|---|---|
| Synthesis condition and characteristics of wax particle | | | | | | | |
| | | | | | | Characteristics | |
| | | Synthesis condition | | | | Average | Anionic |
| Wax | | Usage (part) | | Emulsification temperature | Melting point | particle diameter | group $E_{Wax}$ |
| particle | Wax | Wax | Emulsifier | (° C.) | $T_M$ (° C.) | $D_{Wax}$ (nm) | (μmol/g) |
| 1 | 1 | 70.0 | 30.0 | 120.0 | 90 | 150 | 80 |
| 2 | 1 | 70.0 | 30.0 | 111.7 | 90 | 200 | 80 |
| 3 | 1 | 70.0 | 30.0 | 129.2 | 90 | 95 | 80 |
| 4 | 1 | 70.0 | 30.0 | 128.3 | 90 | 100 | 80 |
| 5 | 1 | 70.0 | 30.0 | 110.0 | 90 | 210 | 80 |
| 6 | 1 | 85.0 | 15.0 | 120.0 | 90 | 150 | 40 |
| 7 | 1 | 81.3 | 18.8 | 120.0 | 90 | 150 | 50 |
| 8 | 1 | 66.3 | 33.8 | 120.0 | 90 | 150 | 90 |
| 9 | 1 | 62.5 | 37.5 | 120.0 | 90 | 150 | 100 |
| 10 | 2 | 70.0 | 30.0 | 120.0 | 90 | 150 | 80 |
| 11 | 3 | 70.0 | 30.0 | 120.0 | 90 | 150 | 80 |
| 12 | 4 | 70.0 | 30.0 | 100.0 | 70 | 150 | 80 |

Wax Particle 13

A water dispersion liquid of paraffin wax (trade name "AQUACER539" produced by BYK Japan KK) was used as a water dispersion liquid of Wax particle 13. Wax 13 in the water dispersion liquid had a melting point $T_M$ of 90° C., an average particle diameter $D_{Wax}$ of 53 nm and an anionic group $E_{Wax}$ of 82 μmol/g. In this regard, the wax particle content in the water dispersion liquid was 35.0%.

Preparation of Ink

Each ink was prepared by mixing each component (unit: %) presented in Table 5-1 to Table 5-3, performing sufficient agitation, and performing pressure filtration with a membrane filter having a pore size of 3.0 μm (produced by ADVANTEC). In Table 5-1 to Table 5-3, "BYK349" is a trade name of a silicone-based surfactant (produced by BYK Japan KK).

TABLE 5-1

| | | | | | | | | | | | |
|---|---|---|---|---|---|---|---|---|---|---|---|
| Composition of ink | | | | | | | | | | | |
| | Ink | | | | | | | | | | |
| | 1 | 2 | 3 | 4 | 5 | 6 | 7 | 8 | 9 | 10 | 11 |
| Type of pigment dispersion liquid | 1 | 2 | 3 | 4 | 5 | 6 | 1 | 7 | 1 | 1 | 1 |
| Type of resin particle | 1 | 1 | 1 | 1 | 1 | 1 | 2 | 1 | 3 | 4 | 5 |
| Type of wax particle | 1 | 1 | 1 | 1 | 1 | 2 | 1 | 1 | 2 | 1 | 1 |
| Pigment dispersion liquid | 20.0 | 20.0 | 20.0 | 20.0 | 20.0 | 20.0 | 20.0 | 20.0 | 20.0 | 20.0 | 20.0 |
| Water dispersion liquid of resin particle | 30.0 | 30.0 | 30.0 | 30.0 | 30.0 | 30.0 | 30.0 | 30.0 | 30.0 | 30.0 | 30.0 |
| Water dispersion liquid of wax particle | 5.0 | 5.0 | 5.0 | 5.0 | 5.0 | 5.0 | 5.0 | 5.0 | 5.0 | 5.0 | 5.0 |
| 1,2-Butanediol | 15.0 | 15.0 | 15.0 | 15.0 | 15.0 | 15.0 | 15.0 | 15.0 | 15.0 | 15.0 | 15.0 |
| Propylene glycol | 5.0 | 5.0 | 5.0 | 5.0 | 5.0 | 5.0 | 5.0 | 5.0 | 5.0 | 5.0 | 5.0 |
| 2-Pyrrolidone | | | | | | | | | | | |
| BYK349 | 1.0 | 1.0 | 1.0 | 1.0 | 1.0 | 1.0 | 1.0 | 1.0 | 1.0 | 1.0 | 1.0 |
| Ion-exchanged water | 24.0 | 24.0 | 24.0 | 24.0 | 24.0 | 24.0 | 24.0 | 24.0 | 24.0 | 24.0 | 24.0 |
| Resin particle content $W_{Em}$ (%) | 9.0 | 9.0 | 9.0 | 9.0 | 9.0 | 9.0 | 9.0 | 9.0 | 9.0 | 9.0 | 9.0 |
| Wax particle content $W_{Wax}$ (%) | 1.5 | 1.5 | 1.5 | 1.5 | 1.5 | 1.5 | 1.5 | 1.5 | 1.5 | 1.5 | 1.5 |

TABLE 5-1-continued

| | | | | | Ink | | | | | | |
|---|---|---|---|---|---|---|---|---|---|---|---|
| | 1 | 2 | 3 | 4 | 5 | 6 | 7 | 8 | 9 | 10 | 11 |
| $W_{Em}/W_{Wax}$ value (times) | 6.0 | 6.0 | 6.0 | 6.0 | 6.0 | 6.0 | 6.0 | 6.0 | 6.0 | 6.0 | 6.0 |
| $D_{Wax}/D_{Pig}$ value (times) | 1.67 | 1.25 | 1.25 | 1.07 | 0.70 | 4.00 | 1.67 | 1.67 | 1.67 | 1.67 | 1.67 |
| $D_{Wax}/D_{Em}$ value (times) | 1.67 | 1.67 | 1.67 | 1.67 | 1.67 | 2.22 | 1.67 | 1.67 | 1.67 | 0.94 | 1.00 |

TABLE 5-2

Composition of ink

| | | | | | | Ink | | | | | |
|---|---|---|---|---|---|---|---|---|---|---|---|
| | 12 | 13 | 14 | 15 | 16 | 17 | 18 | 19 | 20 | 21 | 22 |
| Type of pigment dispersion liquid | 1 | 1 | 1 | 1 | 1 | 1 | 1 | 1 | 1 | 1 | 1 |
| Type of resin particle | 1 | 1 | 1 | 1 | 1 | 1 | 1 | 1 | 1 | 1 | 1 |
| Type of wax particle | 3 | 4 | 2 | 5 | 6 | 7 | 8 | 9 | 1 | 1 | 1 |
| Pigment dispersion liquid | 20.0 | 20.0 | 20.0 | 20.0 | 20.0 | 20.0 | 20.0 | 20.0 | 20.0 | 20.0 | 20.0 |
| Water dispersion liquid of resin particle | 30.0 | 30.0 | 30.0 | 30.0 | 30.0 | 30.0 | 30.0 | 30.0 | 30.0 | 30.0 | 30.0 |
| Water dispersion liquid of wax particle | 5.0 | 5.0 | 5.0 | 5.0 | 5.0 | 5.0 | 5.0 | 5.0 | 25.0 | 23.0 | 3.0 |
| 1,2-Butanediol | 15.0 | 15.0 | 15.0 | 15.0 | 15.0 | 15.0 | 15.0 | 15.0 | 15.0 | 15.0 | 15.0 |
| Propylene glycol | 5.0 | 5.0 | 5.0 | 5.0 | 5.0 | 5.0 | 5.0 | 5.0 | 5.0 | 5.0 | 5.0 |
| 2-Pyrrolidone | | | | | | | | | | | |
| BYK349 | 1.0 | 1.0 | 1.0 | 1.0 | 1.0 | 1.0 | 1.0 | 1.0 | 1.0 | 1.0 | 1.0 |
| Ion-exchanged water | 24.0 | 24.0 | 24.0 | 24.0 | 24.0 | 24.0 | 24.0 | 24.0 | 4.0 | 6.0 | 26.0 |
| Resin particle content $W_{Em}$ (%) | 9.0 | 9.0 | 9.0 | 9.0 | 9.0 | 9.0 | 9.0 | 9.0 | 9.0 | 9.0 | 9.0 |
| Wax particle content $W_{Wax}$ (%) | 1.5 | 1.5 | 1.5 | 1.5 | 1.5 | 1.5 | 1.5 | 1.5 | 7.5 | 6.9 | 0.90 |
| $W_{Em}/W_{Wax}$ value (times) | 6.0 | 6.0 | 6.0 | 6.0 | 6.0 | 6.0 | 6.0 | 6.0 | 1.2 | 1.3 | 10.0 |
| $D_{Wax}/D_{Pig}$ value (times) | 1.06 | 1.11 | 2.22 | 2.33 | 1.67 | 1.67 | 1.67 | 1.67 | 1.67 | 1.67 | 1.67 |
| $D_{Wax}/D_{Em}$ value (times) | 1.06 | 1.11 | 2.22 | 2.33 | 1.67 | 1.67 | 1.67 | 1.67 | 1.67 | 1.67 | 1.67 |

TABLE 5-3

Composition of ink

| | | | | | Ink | | | | | |
|---|---|---|---|---|---|---|---|---|---|---|
| | 23 | 24 | 25 | 26 | 27 | 28 | 29 | 30 | 31 | 32 |
| Type of pigment dispersion liquid | 1 | 1 | 1 | 1 | 9 | 10 | 1 | 8 | 11 | 1 |
| Type of resin particle | 1 | 1 | 1 | 1 | 1 | 1 | 6 | 1 | 2 | 1 |
| Type of wax particle | 1 | 10 | 11 | 12 | 1 | 2 | 1 | 1 | 9 | 13 |
| Pigment dispersion liquid | 20.0 | 20.0 | 20.0 | 20.0 | 20.0 | 20.0 | 20.0 | 20.0 | 20.0 | 20.0 |
| Water dispersion liquid of resin particle | 30.0 | 30.0 | 30.0 | 30.0 | 30.0 | 30.0 | 30.0 | 30.0 | 30.0 | 14.0 |
| Water dispersion liquid of wax particle | 2.5 | 5.0 | 5.0 | 5.0 | 5.0 | 5.0 | 5.0 | 5.0 | 5.0 | 1.5 |
| 1,2-Butanediol | 15.0 | 15.0 | 15.0 | 15.0 | 15.0 | 15.0 | 15.0 | 15.0 | 15.0 | |
| Propylene glycol | 5.0 | 5.0 | 5.0 | 5.0 | 5.0 | 5.0 | 5.0 | 5.0 | 5.0 | 10.0 |
| 2-Pyrrolidone | | | | | | | | | | 15.0 |
| BYK349 | 1.0 | 1.0 | 1.0 | 1.0 | 1.0 | 1.0 | 1.0 | 1.0 | 1.0 | 1.0 |
| Ion-exchanged water | 26.5 | 24.0 | 24.0 | 24.0 | 24.0 | 24.0 | 24.0 | 24.0 | 24.0 | 38.5 |
| Resin particle content $W_{Em}$ (%) | 9.0 | 9.0 | 9.0 | 9.0 | 9.0 | 9.0 | 9.0 | 9.0 | 9.0 | 4.2 |
| Wax particle content $W_{Wax}$ (%) | 0.75 | 1.5 | 1.5 | 1.5 | 1.5 | 1.5 | 1.5 | 1.5 | 1.5 | 0.53 |
| $W_{Em}/W_{Wax}$ value (times) | 12.0 | 6.0 | 6.0 | 6.0 | 6.0 | 6.0 | 6.0 | 6.0 | 6.0 | 7.9 |
| $D_{Wax}/D_{Pig}$ value (times) | 1.67 | 1.67 | 1.67 | 1.67 | 0.68 | 4.17 | 1.67 | 1.67 | 1.67 | 0.59 |
| $D_{Wax}/D_{Em}$ value (times) | 1.67 | 1.67 | 1.67 | 1.67 | 1.67 | 2.22 | 1.67 | 1.67 | 1.67 | 0.59 |

Evaluation

Recording of Image

A cartridge was filled with prepared each reaction liquid and each ink and set into an ink jet recording apparatus (trade name "imagePROGRAF PRO-2000" produced by CANON KABUSHIKI KAISHA) including a recording head that was configured to eject an ink by thermal energy. In the recording apparatus, a heating apparatus for drying a recording medium provided with the reaction liquid and the ink was incorporated at a position downstream of the recording head in the conveyance direction of the recording medium. The recording environment was set to be a tem-perature of 25° C. and a relative humidity of 50%. In the present example, an image printed under the condition in which an ink droplet of 4.0 ng was applied to a unit region of $\frac{1}{1,200}$ inch×$\frac{1}{1,200}$ inch was denoted as an image with a print duty of 100%. A 2 cm×2 cm solid image was printed by providing, on top of one another, the reaction liquid and the ink presented in Table 7, where the print duty of the reaction liquid was 50% and the print duty of the ink was 160%. Thereafter, the heating apparatus was used, and the printed image was heated and dried in accordance with a heating method presented in Table 7. The heating tempera-ture was measured using a radiation thermometer (trade name "FT3700" produced by HIOKI). The heating method is presented in detail in Table 6. In the present disclosure, regarding the evaluation criteria of each item described below, "A" and "B" were tolerable levels, and "C" was an intolerable level. The evaluation results are presented in Table 7. In addition, recording media used are described below. In this regard, "Comparative example 10" is a specific example corresponding to "Example 8" in Japanese Unexamined Patent Application Publication No. 2021-142725.

Recording medium 1: trade name "Scotchcal Graphic Film IJ1220N" produced by 3M, material=polyvinyl chloride and an amount of water absorbed within 30 $msec^{1/2}$ from start of contact based on the Bristow method=0 $mL/m^2$ or more to 10 $mL/m^2$ or less Recording medium 2: high-quality exclusive paper, "trade name "HR—101S" produced by CANON KABUSHIKI KAISHA and an amount of water absorbed within 30 $msec^{1/2}$ from start of contact based on the Bristow method=more than 10 $mL/m^2$

TABLE 6

| Heating method | | | |
|---|---|---|---|
| | | Heating temperature $T_F$ (° C.) | Detail |
| Heating method | 1 | 70 | drying by blowing warm air to surface of recording medium |
| | 2 | 80 | drying by blowing warm air to surface of recording medium |
| | 3 | 60 | drying by blowing warm air to surface of recording medium |
| | 4 | 70 | drying by heating back surface of recording medium with platen heater |
| | 5 | 90 | drying by blowing warm air to surface of recording medium |
| | 6 | 55 | drying by blowing warm air to surface of recording medium |

Abrasion Resistance

An abrasion test in which Color Fastness Rubbing Tester (produced by TESTER SANGYO CO., LTD.) that is a color fastness tester II (Gakushin type) in conformity with JIS L 0849 was used, an abrasion white cloth (cotton) specified in JIS L 0803 was used, and a load of 500 g was reciprocally moved 150 times on the surface of the printed image. The image after the abrasion test was visually examined, and the abrasion resistance of the image was evaluated in accordance with the following evaluation criteria.

A: No scratch on the image was observed after 150 times of reciprocal movement.

B: A scratch on the image was observed after 150 times of reciprocal movement, but a white ground of the recording medium did not appear.

C: A scratch on the image was observed after 150 times of reciprocal movement, and a white ground of the recording medium appeared.

Color Developability

The above-described ink jet recording apparatus was used, the reaction liquid and the ink presented in Table 7 were provided to the recording medium in this order so that ten types of solid images were printed where the print duty was changed by 10% between 10% to 100%. The brightness (L*) and the chroma (C*) of each solid image were measured using a fluorescent spectrodensitometer (trade name "FD-7" produced by KONICA MINOLTA, INC.). L* and C* are in accordance with the color difference display method specified by CIE. Subsequently, the color developability of the image was evaluated in accordance with the evaluation criteria presented in Table 8. In the present example, when the coloring material was carbon black, the ink was assumed to be a black ink and when the coloring material was C.I. Pigment Blue 15:3, the ink was assumed to be a cyan ink. Further, when the coloring material was C.I. Pigment Red 122, the ink was assumed to be a magenta ink, and when the coloring material was C.I. Pigment Yellow 74, the ink was assumed to be a yellow ink. In this regard, in the instance of the black ink, the brightness being low means that the image is deep and that the color developability is favorable. In addition, in the instance of the color ink (each of the cyan ink, the magenta ink and the yellow ink), the chroma being high means that the image is vivid and that the color developability is favorable.

TABLE 7

| | | Evaluation condition and evaluation result | | | | | |
|---|---|---|---|---|---|---|---|
| | | Evaluation condition | | | | Evaluation result | |
| | | Reaction liquid | Ink | Heating method | Recording medium | Abrasion resistance | Color developability |
| Example | 1 | 1 | 1 | 1 | 1 | A | A |
| | 2 | 1 | 2 | 1 | 1 | A | A |
| | 3 | 1 | 3 | 1 | 1 | A | A |
| | 4 | 1 | 4 | 1 | 1 | A | A |
| | 5 | 1 | 1 | 2 | 1 | A | A |
| | 6 | 1 | 5 | 1 | 1 | A | A |
| | 7 | 1 | 6 | 1 | 1 | A | A |
| | 8 | 1 | 1 | 3 | 1 | A | A |
| | 9 | 1 | 7 | 1 | 1 | A | A |
| | 10 | 1 | 8 | 1 | 1 | A | A |
| | 11 | 1 | 9 | 1 | 1 | A | A |
| | 12 | 1 | 10 | 1 | 1 | B | A |
| | 13 | 1 | 11 | 1 | 1 | A | A |
| | 14 | 1 | 12 | 1 | 1 | B | A |
| | 15 | 1 | 13 | 1 | 1 | A | A |
| | 16 | 1 | 14 | 1 | 1 | A | A |
| | 17 | 1 | 15 | 1 | 1 | A | B |
| | 18 | 1 | 16 | 1 | 1 | A | B |
| | 19 | 1 | 17 | 1 | 1 | A | A |

TABLE 7-continued

| | | | | Evaluation condition and evaluation result | | |
|---|---|---|---|---|---|---|
| | | | Evaluation condition | | Evaluation result | |
| | | Reaction liquid | Ink | Heating method | Recording medium | Abrasion resistance | Color developability |
| | 20 | 1 | 18 | 1 | 1 | A | A |
| | 21 | 1 | 19 | 1 | 1 | B | A |
| | 22 | 1 | 20 | 1 | 1 | A | B |
| | 23 | 1 | 21 | 1 | 1 | A | A |
| | 24 | 1 | 22 | 1 | 1 | A | A |
| | 25 | 1 | 23 | 1 | 1 | B | A |
| | 26 | 2 | 1 | 1 | 1 | A | A |
| | 27 | 3 | 1 | 1 | 1 | B | A |
| | 28 | 4 | 1 | 1 | 1 | B | A |
| | 29 | 5 | 1 | 1 | 1 | B | A |
| | 30 | 1 | 24 | 1 | 1 | B | A |
| | 31 | 1 | 25 | 1 | 1 | B | A |
| | 32 | 1 | 1 | 1 | 2 | B | A |
| | 33 | 1 | 1 | 4 | 1 | B | A |
| Comparative | 1 | 1 | 1 | 5 | 1 | C | A |
| example | 2 | 1 | 26 | 1 | 1 | C | A |
| | 3 | 1 | 1 | 6 | 1 | C | A |
| | 4 | 1 | 27 | 1 | 1 | C | A |
| | 5 | 1 | 28 | 1 | 1 | A | C |
| | 6 | 1 | 29 | 1 | 1 | C | A |
| | 7 | 1 | 30 | 1 | 1 | C | A |
| | 8 | 1 | 31 | 1 | 1 | C | A |
| | 9 | — | 1 | 1 | 1 | A | C |
| | 10 | 1 | 32 | 5 | 1 | C | A |

TABLE 8

Evaluation criteria of color developability

| Type of ink | Eval- uation | Evaluation criteria |
|---|---|---|
| Black ink | A | The minimum value of brightness L* was 9 or less. |
| | B | The minimum value of brightness L* was more than 9 to 10 or less. |
| | C | The minimum value of brightness L* was more than 10. |
| Cyan ink | A | The maximum value of chroma C* was 65 or more. |
| | B | The maximum value of chroma C* was 60 or more to less than 65. |
| | C | The maximum value of chroma C* was less than 60. |
| Magen- ta ink | A | The maximum value of chroma C* was 75 or more. |
| | B | The maximum value of chroma C* was 70 or more to less than 75. |
| | C | The maximum value of chroma C* was less than 70. |
| Yellow ink | A | The maximum value of chroma C* was 105 or more. |
| | B | The maximum value of chroma C* was 100 or more to less than 105. |
| | C | The maximum value of chroma C* was less than 100. |

According to the present disclosure, an ink jet recording method capable of recording an image having excellent abrasion resistance and color developability by using an aqueous ink and an aqueous reaction liquid is provided. In addition, according to the present disclosure, an ink jet recording apparatus used for the ink jet recording method is provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-074068, filed Apr. 28, 2023 and No. 2024-051818 filed Mar. 27, 2024, which are hereby incorporated by reference herein in their entirety.

What is claimed is:

1. An ink jet recording method for recording an image on a recording medium by using an aqueous ink and an aqueous reaction liquid containing a reaction agent that reacts with the aqueous ink, comprising:

providing the recording medium with the aqueous reaction liquid;

providing the aqueous ink so that the aqueous ink overlaps at least a portion of a region of the recording medium to be provided with the aqueous reaction liquid; and heating the recording medium provided with the aqueous ink and the aqueous reaction liquid to a predetermined heating temperature $T_F$ (° C.), wherein the aqueous ink contains a pigment dispersed by an action of an anionic group, a resin particle and a wax particle, the heating temperature $T_F$ (° C.), a glass transition temperature $T_G$ (° C.) of the resin particle and a melting point $T_M$ (° C.) of the wax particle satisfy a relationship denoted by Formula (1), an average particle diameter $D_{Pig}$ (nm) of the pigment and an average particle diameter $D_{Wax}$ (nm) of the wax particle satisfy a relationship denoted by Formula (2) and an anionic group $E_{Pig}$ (μmol/g) of the pigment, an anionic group $E_{Em}$ (μmol/g) of the resin particle and an anionic group $E_{Wax}$ (μmol/g) of the wax particle satisfy a relationship denoted by Formula (3):

$$T_M > T_F \geq (T_G - 10) \tag{1}$$

$$4.00 \geq \left(D_{Wax}/D_{Pig}\right) \geq 0.70 \tag{2}$$

$$E_{Wax} \leq E_{Em} < E_{Pig}. \tag{3}$$

2. The ink jet recording method according to claim 1, wherein an average particle diameter $D_{Em}$ (nm) of the resin particle and the average particle diameter $D_{Wax}$ (nm) of the wax particle satisfy a relationship denoted by Formula (4):

$$3.00 \geq \left(D_{Wax}/D_{Em}\right) \geq 1.00. \tag{4}$$

3. The ink jet recording method according to claim 1, wherein the average particle diameter $D_{Wax}$ (nm) of the wax particle is 100 nm or more to 200 nm or less.

4. The ink jet recording method according to claim 1, wherein the anionic group $E_{Wax}$ (μmol/g) of the wax particle is 50 μmol/g or more to 90 μmol/g or less.

5. The ink jet recording method according to claim 1, wherein a content $W_{Wax}$ (% by mass) of the wax particle in the aqueous ink and a content $W_{Em}$ (% by mass) of the resin particle in the aqueous ink satisfy Formula (5):

$$1.3 \leq \left(W_{Em}/W_{Wax}\right) \leq 10.0. \tag{5}$$

6. The ink jet recording method according to claim 1, wherein the reaction agent contains a cationic resin and at least one of an organic acid and a polyvalent metal salt.

7. The ink jet recording method according to claim 1, wherein a material for forming the wax particle comprises Fischer-Tropsch wax.

8. The ink jet recording method according to claim 1, wherein an amount of water absorbed by the recording medium within 30 msec$^{1/2}$ from start of contact in the Bristow method is 10 mL/m$^2$ or less.

9. The ink jet recording method according to claim 1, wherein the recording medium is heated by blowing air to a surface of the recording medium.

10. An ink jet recording apparatus used for recording an image on a recording medium by using an aqueous ink and an aqueous reaction liquid containing a reaction agent that reacts with the aqueous ink, comprising:

a reaction-liquid-providing unit configured to provide the recording medium with the aqueous reaction liquid;

an ink-providing unit configured to provide the aqueous ink so that the aqueous ink overlaps at least a portion of a region of the recording medium to be provided with the aqueous reaction liquid; and a heating unit configured to heat the recording medium provided with the aqueous ink and the aqueous reaction liquid to a predetermined heating temperature $T_F$ (° C.), wherein the aqueous ink contains a pigment dispersed by an action of an anionic group, a resin particle and a wax particle, the heating temperature $T_F$ (° C.), a glass transition temperature $T_G$ (° C.) of the resin particle and a melting point $T_M$ (° C.) of the wax particle satisfy a relationship denoted by Formula (1), an average particle diameter $D_{Pig}$ (nm) of the pigment and an average particle diameter $D_{Wax}$ (nm) of the wax particle satisfy a relationship denoted by Formula (2) and an anionic group $E_{Pig}$ (μmol/g) of the pigment, an anionic group $E_{Em}$ (μmol/g) of the resin particle and an anionic group $E_{Wax}$ (μmol/g) of the wax particle satisfy a relationship denoted by Formula (3):

$$T_M > T_F \geq (T_G - 10) \tag{1}$$

$$4.00 \geq \left(D_{Wax}/D_{Pig}\right) \geq 0.70 \tag{2}$$

$$E_{Wax} \leq E_{Em} < E_{Pig}. \tag{3}$$

\*  \*  \*  \*  \*